(12) United States Patent
Annapureddy

(10) Patent No.: US 12,052,284 B1
(45) Date of Patent: Jul. 30, 2024

(54) SYSTEM AND METHOD FOR DETECTING PHISHING ATTACKS IN SMS COMMUNICATIONS

(71) Applicant: Tanla Digital Labs Private Limited, Hyderabad (IN)

(72) Inventor: Kishore Annapureddy, Hyderabad (IN)

(73) Assignee: Tanla Digital Labs Private Limited, Madhapur (IN)

(*) Notice: Subject to any disclaimer, the term of this patent is extended or adjusted under 35 U.S.C. 154(b) by 0 days.

(21) Appl. No.: 18/421,790

(22) Filed: Jan. 24, 2024

(30) Foreign Application Priority Data

Jan. 25, 2023 (IN) .............................. 202341005055

(51) Int. Cl.
*H04L 9/40* (2022.01)
(52) U.S. Cl.
CPC ................................ *H04L 63/1483* (2013.01)
(58) Field of Classification Search
CPC ................................................... H04L 63/1483
See application file for complete search history.

(56) References Cited

U.S. PATENT DOCUMENTS

| | | | | |
|---|---|---|---|---|
| 8,321,936 B1* | 11/2012 | Green | ................ | H04L 63/1416 718/1 |
| 9,456,000 B1* | 9/2016 | Spiro | ................ | G06F 16/24578 |
| 9,565,209 B1* | 2/2017 | Grzonkowski | ....... | H04L 51/046 |
| 9,774,626 B1* | 9/2017 | Himler | ................ | H04L 63/1483 |
| 10,069,865 B2* | 9/2018 | Xavier | ................ | G06F 21/562 |
| 11,392,691 B1* | 7/2022 | Wright | ................ | H04L 63/145 |
| 11,595,437 B1* | 2/2023 | Mushtaq | ............. | H04L 63/1483 |
| 11,757,914 B1* | 9/2023 | Jakobsson | ............... | H04L 51/42 726/25 |
| 11,895,151 B1* | 2/2024 | Castro | ................ | H04L 63/1425 |
| 2006/0277259 A1* | 12/2006 | Murphy | ................ | H04L 51/212 709/206 |
| 2010/0011071 A1* | 1/2010 | Zheleva | ............. | H04L 63/1433 709/206 |
| 2012/0151585 A1* | 6/2012 | Lamastra | ................ | H04L 51/58 726/24 |

(Continued)

*Primary Examiner* — Khang Do
(74) *Attorney, Agent, or Firm* — HSML P.C.

(57) ABSTRACT

Disclosed herein is a method, system and non-transitory computer-readable medium of detecting phishing attacks in Short Message Service (SMS) communications. The method comprises determining a sender reputation score of a sender of an SMS message and Call To Action (CTA) information embedded in the SMS message. Further, the method comprises classifying each of a message pattern, the sender, and the CTA information as one of 'good', 'bad' and 'unknown' based on a comparison with predetermined message pattern data, predetermined sender reputation data, and predetermined CTA information. Subsequently, the method comprises detecting that the SMS message is a 'phishing' message based on the classifications of the message pattern, the sender, and the CTA information. Finally, the method comprises transmitting an alert notification to a telecommunication server, upon detecting SMS message the 'phishing' message and automatically blocking the 'phishing' message from being routed to a recipient.

27 Claims, 6 Drawing Sheets

(56) References Cited

U.S. PATENT DOCUMENTS

| | | | |
|---|---|---|---|
| 2015/0067833 A1* | 3/2015 | Verma | H04L 63/1483 |
| | | | 726/22 |
| 2016/0014151 A1* | 1/2016 | Prakash | H04L 47/62 |
| | | | 726/22 |
| 2019/0349400 A1* | 11/2019 | Bruss | G06F 21/568 |
| 2020/0034752 A1* | 1/2020 | Luo | G06Q 10/107 |
| 2020/0067861 A1* | 2/2020 | Leddy | G06F 21/6245 |
| 2020/0067955 A1* | 2/2020 | Hass | H04L 12/40013 |
| 2020/0374251 A1* | 11/2020 | Warshaw | H04L 51/56 |
| 2021/0021612 A1* | 1/2021 | Higbee | H04L 63/1491 |
| 2021/0153011 A1* | 5/2021 | Weinberg | H04L 63/0884 |
| 2021/0344713 A1* | 11/2021 | Kras | H04L 51/18 |
| 2022/0014543 A1* | 1/2022 | Jakobsson | H04L 63/123 |
| 2022/0141165 A1* | 5/2022 | Lee | H04L 63/0245 |
| | | | 709/206 |
| 2022/0166784 A1* | 5/2022 | Patton | H04L 51/212 |
| 2022/0210188 A1* | 6/2022 | Grewal | H04L 63/1483 |
| 2023/0010945 A1* | 1/2023 | Soryal | H04L 63/145 |
| 2023/0224327 A1* | 7/2023 | Haworth | H04L 63/1441 |
| | | | 726/23 |
| 2023/0319065 A1* | 10/2023 | Mears | H04L 51/21 |
| | | | 726/23 |
| 2023/0403247 A1* | 12/2023 | Berry | H04L 63/1483 |

\* cited by examiner

SYSTEM AND METHOD FOR DETECTING PHISHING ATTACKS IN SMS COMMUNICATIONS

CROSS REFERENCE TO RELATED APPLICATION

This application claims the benefit of priority to Indian Provisional Patent Application Number 202341005055, filed on Jan. 25, 2023, the entire contents of which are hereby incorporated by reference.

FIELD OF THE DISCLOSURE

The present disclosure in general relates to cybercrimes and more particularly, to a method and system for detecting phishing attacks in SMS communications.

BACKGROUND

Phishing attacks have been escalating day by day, where attackers deceive people into revealing sensitive information or installing malware such as, without limiting to, ransomware. Of late, phishing has become the most common type of cybercrime, with many cybercrime regulatory bodies reporting more incidents of phishing than any other type of digital crime. Smishing is a type of phishing attack that includes attackers sending various types of Short Messaging Service (SMS) messages to a user, wherein the SMS messages may contain links to open unsecured websites and prompt the user for login credentials or other personal data. Smishing attack targets mobile phone users enticing them with exciting job offers, holiday offers or lottery prizes, which eventually results in the users revealing confidential information such as, without limiting to, usernames, passwords, credit card or debit card details etc.

Currently, there exist methods and systems for detecting phishing emails, categorizing them as spam or junk and automatically filtering such emails from the inbox. Such anti-phishing systems can be easily designed due to the highly secured Internet platform, a number of Internet service providers providing secured connections and most importantly due to firewalls installed in every computing device. On the other hand, phishing that occurs through the telecommunication channels, unfortunately, does not involve such secured gateways to filter out phishing SMSs, and hence it is not possible to avoid phishing through SMS and it has been increasing day by day. Further, passing each and every SMS message received at a base station or a switching center through an anti-phishing filter may be more time consuming and delays processing of each message and eventually result in late delivery of genuine messages.

Hence, there is a need for a method and system to efficiently detect smishing messages from a large number of messages transmitted on a day-to-day basis. Further, there is also a need for the system to be robust, accurate and fast in deciding whether any message is phishing or not.

The information disclosed in this background of the disclosure section is only for enhancement of understanding of the general background of the disclosure and should not be taken as acknowledgment or any form of suggestion that this information forms prior art already known to a person skilled in the art.

SUMMARY

Disclosed herein is a method for detecting phishing attacks in Short Message Service (SMS) communications. The method comprises determining a sender reputation score of a sender of an SMS message and Call To Action (CTA) information embedded in the SMS message. Further, the method comprises retrieving, via a communication network, a pre-determined message pattern data, pre-determined sender reputation data, and pre-determined CTA information from a database associated with the phishing detection system. Subsequently, the method comprises classifying each of a message pattern, the sender, and the CTA information as one of good, bad and unknown based on a comparison with the pre-determined message pattern data, the pre-determined sender reputation data, and the pre-determined CTA information. Furthermore, the method comprises detecting that the SMS message is a phishing message based on the classifications of the message pattern, the sender, and the CTA information. Finally, the method comprises transmitting, via a cellular communication network, an alert notification to a telecommunication server, upon detecting SMS message the phishing message and automatically blocking the phishing message from being routed to a recipient.

Disclosed herein is a phishing detection system for detecting phishing attacks in Short Message Service (SMS) communications, comprising a memory and a processor coupled with the memory. The processor is configured to determine a sender reputation score of a sender of an SMS message and Call To Action (CTA) information embedded in the SMS message. Subsequently, the processor is configured to retrieve, via a communication network, a pre-determined message pattern data, pre-determined sender reputation data, and pre-determined CTA information from a database associated with the phishing detection system. Further, the processor is configured to classify each of a message pattern, the sender, and the CTA information as one of good, bad and unknown based on a comparison with the pre-determined message pattern data, the pre-determined sender reputation data, and the pre-determined CTA information. Furthermore, the processor is configured to detect that the SMS message is a phishing message based on the classifications of the message pattern, the sender, and the CTA information. Finally, the processor is configured to transmit, via a cellular communication network, an alert notification to a telecommunication server, upon detecting SMS message the phishing message and automatically block the phishing message from being routed to a recipient.

Disclosed herein is a non-transitory computer-readable medium having program instructions stored thereon, when executed by a phishing detection system, facilitate the phishing detection system for detecting phishing attacks in Short Message Service (SMS) communications by performing operations. The operations comprise determining a sender reputation score of a sender of an SMS message and Call To Action (CTA) data embedded in the SMS message and retrieving via a communication network, a pre-determined message pattern data, pre-determined sender reputation data, and pre-determined CTA data from a database associated with the phishing detection system. The operations further comprise classifying each of a message pattern, the sender, and the CTA data as one of good, bad and unknown based on a comparison with the pre-determined message pattern data, the pre-determined sender reputation data, and the pre-determined CTA data and detecting that the SMS message is a phishing message based on the classifications of the message pattern, the sender, and the CTA data. The operations also comprise transmitting via a cellular communication network, an alert notification to a telecommunication server, upon detecting SMS message the phishing message and automatically blocking the phishing message from being delivered to a recipient.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of device or system and/or methods in accordance with embodiments of the present subject matter are now described, by way of example only, and with reference to the accompanying figures, in which.

Figure 1:
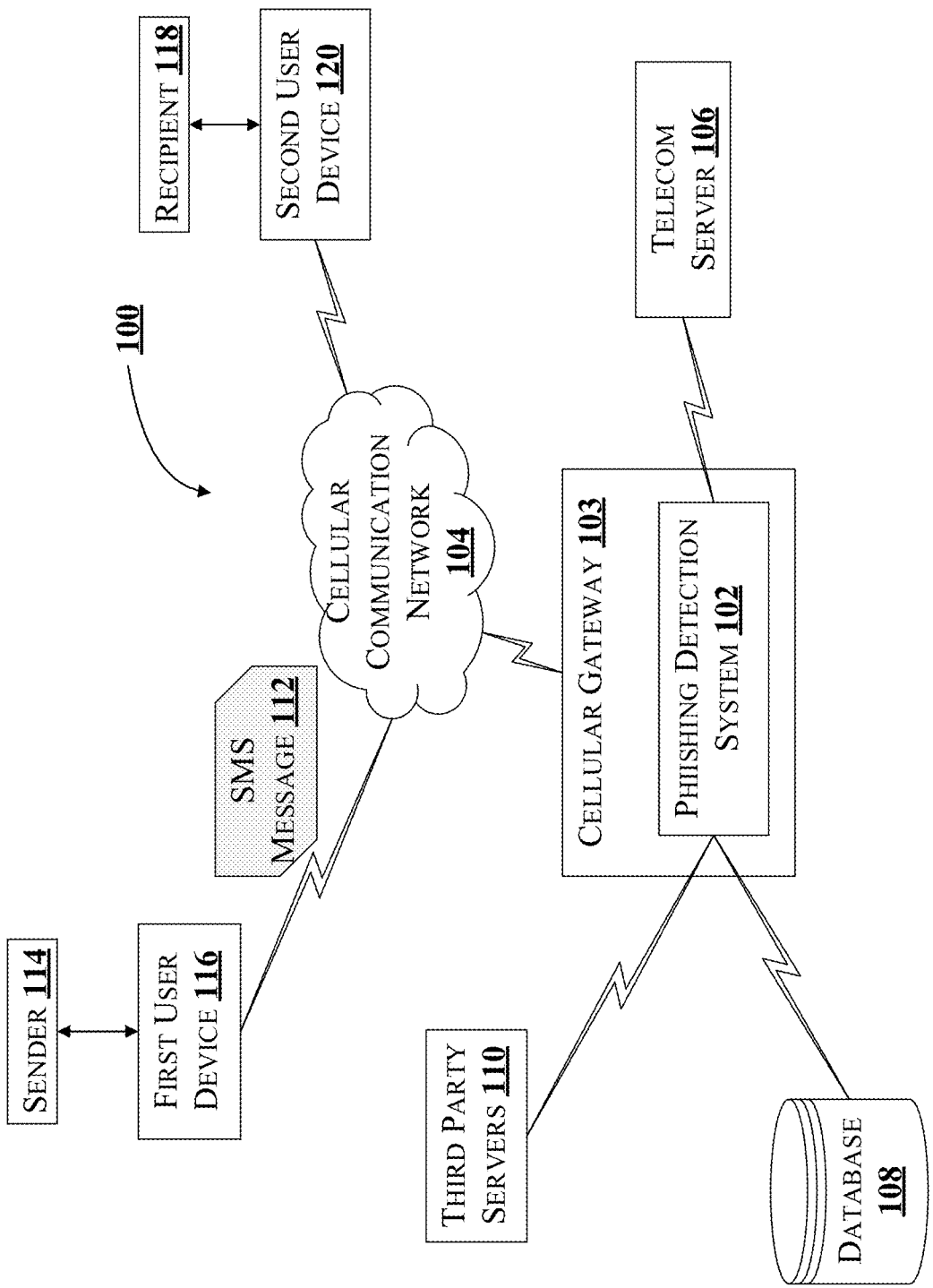
FIG. 1 illustrates an exemplary architecture of a system for detecting, preventing and eliminating phishing attacks in SMS communications in accordance with an embodiment of the present disclosure.

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a device or system or apparatus proceeded by "comprises . . . a" does not, without more constraints, preclude the existence of other elements or additional elements in the device or system or apparatus.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 illustrates an exemplary architecture of a system for detecting, preventing and eliminating phishing attacks in SMS communications in accordance with an embodiment of the present disclosure.

As shown in FIG. 1, an exemplary architecture of a system 100 comprises one or more components configured for detecting, preventing and eliminating phishing in SMS communications. In one embodiment, the system 100 comprises, without limiting to, a Phishing Detection System (PDS) 102 configured within a cellular gateway 103 of a cellular communication network 104, a telecom server 106 and a database 108. The system 100 also comprises, without limiting to, third party servers 110 that are communicatively coupled to the PDS 102 via a communication network (not shown).

In an embodiment, the cellular gateway 103 may be a mobile telephone switching office, a mobile switching center or any other gateway that is configured to provide voice, video and messaging communications to one or more mobile users. In particular, the cellular gateway 103 may be configured to receive an SMS message 112 via the cellular communication network 104 from a sender 114, who is communicating using a first user device 116. The cellular gateway 103 may be further configured to route the SMS message 112 received from the sender 114 to a recipient 118, who is communicating using a second user device 120, through the cellular communication network 104. In an embodiment, the cellular gateway 103 may comprise the PDS 102 to monitor the SMS message 112 received at the cellular gateway 103 via the cellular communication network 104 and detect if the SMS message 112 is a 'phishing' message or not. In some embodiments, the cellular gateway 103 may be the telecom server 106 that may be configured to provide the voice, video and messaging communications through Session Initiation Protocol (SIP) such as, but not limited to, Voice Over Internet Protocol (VOIP) and Voice over Long-Term Evolution (VoLTE) services. The telecom server 106 may be any computing device such as, without limiting to, server, associated with a telecommunication operator, which is communicatively coupled to the cellular gateway 103. The telecom server 106 is capable of providing internet telephony applications, through SIP, including initiating, maintaining and terminating communication sessions that include voice, video and messaging applications.

The telecom server 106 may also be capable of providing mobile phone calling over mobile technologies such as Long-Term Evolution (LTE).

In an embodiment, the cellular communication network 104 is a mobile communication network that provides wireless communication for voice, data and SMS communication services to mobile devices. The cellular communication network 104 may be any of a $2^{nd}$ Generation (2G), $3^{rd}$ Generation (3G), GSM, CDMA, GPRS, $4^{th}$ Generation (4G), Long Term Evolution (LTE), Voice over LTE (VoLTE), $5^{th}$ Generation (5G) or other networks. In one embodiment, the cellular communication network 104 can include cellular gateway 103 and the telecom server 106.

The database 108 may be configured to store phone numbers of senders and SMS messages that have been classified as 'blacklisted' or 'whitelisted'. The database 108 may also comprise a plurality of words, and patterns that correspond to 'phishing' messages, which are extracted from historical 'phishing' messages exchanged between various users. The database 108 may also comprise a number of Uniform Resource Locators (URLs) and phone numbers that have been blacklisted in the past by a user or a PDS administrator or a machine. The database 108 may be configured to communicatively coupled with the communication network or may be integrated within the PDS 102.

In an embodiment, the communication network may include, without limitation, a direct interconnection, a Local Area Network (LAN), a Wide Area Network (WAN), a wireless network, a point-to-point network, or any other network configuration. One of the most common types of networks in current use is a Transfer Control Protocol and Internet Protocol (TCP/IP) network for communication between a database client and a database server. Other common Internet Protocols (IP) that may be used for such communication include Hyper Text Transfer Protocol Secure (HTTPS), File Transfer Protocol (FTP), and Wireless Application Protocol (WAP) and other secure communication protocols etc.

The third-party servers 110 may be one or more web servers that are used to verify if a call to action within an SMS message 112 is 'genuine or malicious related to 'bad'. The third-party servers 110 may be any web servers that receive requests from one or more client devices to verify if a URL is genuine or malicious. The third-party servers 110 may compare the received URL with a plurality of malicious URLs stored in databases, associated with the third party servers 110, and may respond to the requested client if the URL is malicious or genuine.

In one embodiment, the sender 114 may send an SMS message 112 using the first user device 116 to the second user device 120 of the recipient 118 through the cellular communication network 104. The cellular gateway 103 may receive the SMS message 112 being transmitted in the cellular communication network 104 and may route the SMS message 112 to the second user device 120. At this stage, the PDS 102 configured within the cellular gateway 103 may receive, analyze, and evaluate one or more parameters of the SMS message 112 and detect if the SMS message 112 is 'phishing' or 'genuine'. In an embodiment, when the PDS 102 detects that the SMS message 112 is a 'phishing' message, the PDS 102 may block the SMS message 112 from being routed to the second user device 120, thereby preventing the phishing attack on the recipient 118. Alternatively, when the PDS 102 detects that the SMS message 112 is a 'genuine' message, the PDS 102 may allow transmission of the SMS message 112 to the recipient 118 via the telecom server 106. In some embodiments, the PDS 102 may transmit a notification to the telecom server 106 that the SMS message 112 is a phishing message or a genuine message and request the telecom server 106 to respectively block or allow the SMS message 112 from being routed to the recipient 118 via the telecom server 106. A detailed explanation of an operation of the PDS 102 to detect a 'phishing' message is described below.

Figure 2:
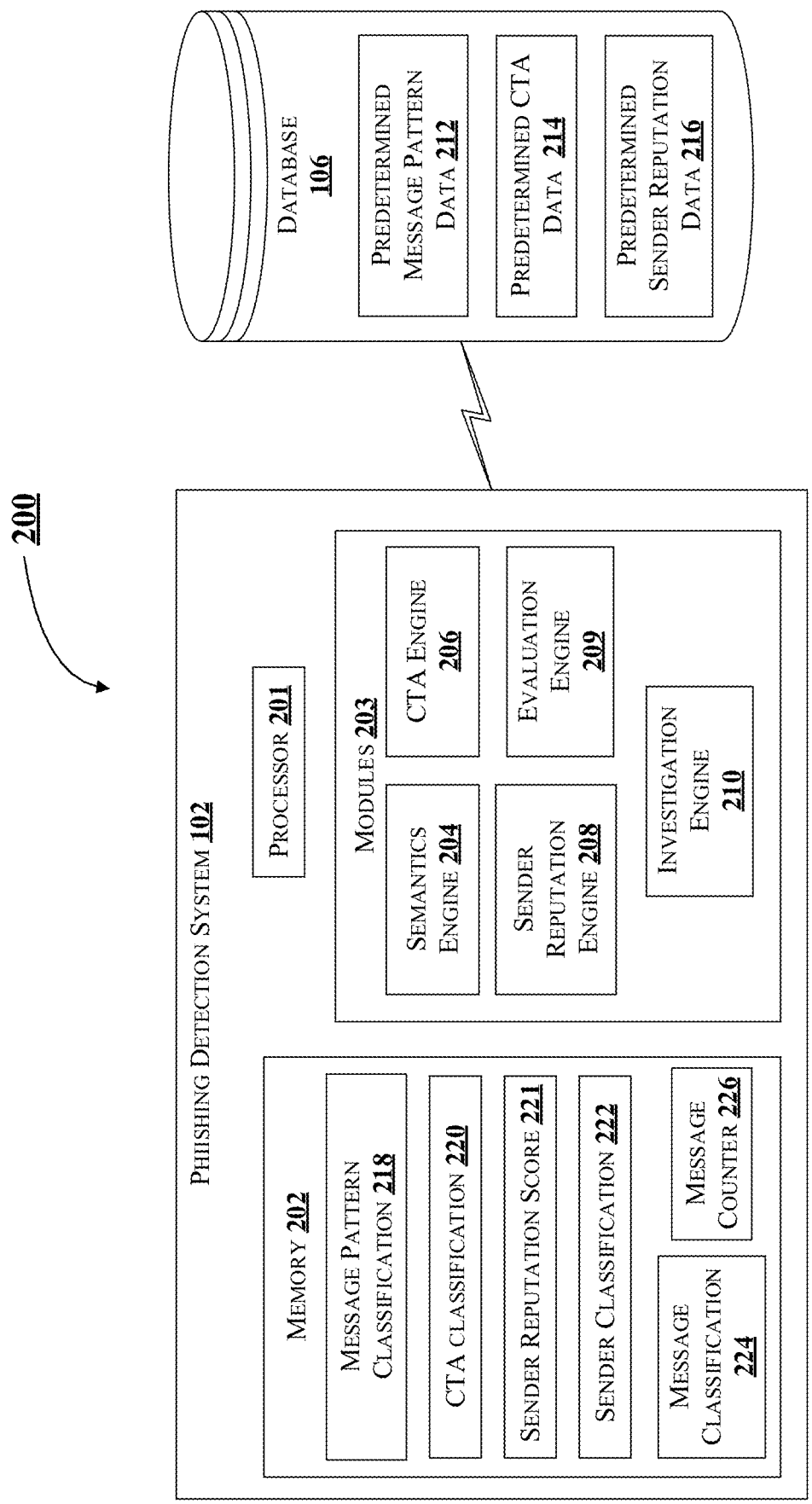
FIG. 2 illustrates an exemplary block diagram of a Phishing Detection System (PDS) and a database for detecting phishing attacks in SMS communications in accordance with an embodiment of the present disclosure.

FIG. 2 shows an exemplary block diagram of the PDS 102 for detecting phishing attacks in SMS communications in accordance with an embodiment of the present disclosure.

As shown in FIG. 2, the PDS 102 may be a server computing device comprising the processor 201, the memory 202, and a plurality of modules 203. The modules 203 may comprise, without limiting to, a semantics engine 204, a Call To Action (CTA) engine 206, a sender reputation engine 208, an evaluation engine 209, and an investigation engine 210. In some embodiments, the modules 203 may be configured within the processor 201. The modules 203 may be implemented using hardware, and/or software, or partly by hardware and partly by software or firmware. The functionality of each of the plurality of modules 203 is explained in detail further below.

In one embodiment, the semantics engine 204 may analyze the SMS message 112 and may classify a message pattern of the SMS message 112 as a 'genuine' message pattern or a 'phishing' message pattern or an 'unknown' message pattern. The pattern of the SMS message 112 may indicate a sequence of one or more of text portions, alphanumeric portions, or numeric portions within the SMS message 112. For example, the numeric or alphanumeric values may be an OTP number, an amount, a mobile number, an account number, etc., and the text portion can be one or more words within the SMS message 112.

In some embodiments, the semantics engine 204 may use a Machine Learning (ML) model for classifying the message pattern for messages in a plurality of languages other than English.

Initially, the semantics engine 204 may compare the SMS message 112 with a plurality of message patterns within predetermined message pattern data 212 stored in the database 108. The predetermined message pattern data 212 comprises, without limiting to, a plurality of whitelist message patterns, such as, but not limited to, patterns of one or more 'genuine' messages received from a bank indicating debit or credit transactions, and a plurality of blacklist message patterns, such as, but not limited to, patterns of one or more 'phishing' messages including hyperlinks or URLs that fraudulently prompt users to reveal their personal information such as usernames, passwords, account numbers, a debit card Personal Identification Number (PIN).

Each message pattern of the predetermined message pattern data 212 has a pattern identifier or a template identifier, which is used to identify the message pattern. Further, the semantics engine 204 may classify the message pattern as a 'genuine' or a 'good' pattern if the SMS message 112 matches with a whitelist message pattern in the database 108. Alternatively, the semantics engine 204 may classify the message pattern as a 'bad' or 'phishing' pattern if the SMS message 112 matches with a blacklist message pattern in the database 108. On the other hand, if the SMS message 112 does not match with any of the existing patterns in the database 108, the semantics engine 204 may classify the message pattern as an 'unknown' pattern. Further, the semantics engine 204 may store the classification of the message pattern as message pattern classification 218. In some embodiments, the semantics engine 204 may be configured with an ML model that is trained using a language model to classify the message pattern as one of 'good', 'bad' or 'unknown'. For example, the ML model may be a Language Agnostic Bidirectional Encoder Representations from Transformers (BERT) Sentence Embedding (LaBSE) model.

In some embodiments, the semantics engine 204 may be configured to create new patterns using a list of pending messages if the pattern of the SMS message 112 does not match with any of the message patterns stored in the database 108. The list of pending messages includes a number of SMS messages, wherein the message pattern of each SMS message 112 has been classified as 'unknown'.

In an exemplary embodiment, the semantics engine 204 may compare the SMS message 112 with each pending message of the list of pending messages and determine a similarity value for the SMS message 112, based on the comparison of the SMS message 112 and each pending message of the list of pending messages. The similarity value indicates a percentage of similarity of the SMS message 112 with the pending message. In some embodiments, the semantics engine 204 may use an inverted index method to determine the similarity value. In these embodiments, the semantics engine 204 may determine a number of words of the SMS message 112 matching with each pending message of the list of pending messages and may determine if a predetermined threshold number of words are matching with any of the pending messages.

Further in the exemplary embodiment, the semantics engine 204 may determine if the similarity value for the SMS message 112 exceeds a predetermined threshold score when compared with any pending message of the list of pending messages. If the similarity value of the SMS message 112 exceeds the predetermined threshold score when compared with at least one pending message, the semantics engine 204 creates a new pattern based on the SMS message 112 and the at least one pending message. For example, the SMS message 112 is "Your OTP for transaction xyz1234abc is 164572" and a pending message is "Your OTP for transaction abc is 4572", the semantics engine 204 creates a message pattern "Your OTP for transaction {#word-any #} is {#word-num #}", by replacing alphanumeric values with variable names and retaining text content of the messages as the same. However, the method of creating message patterns may not be limited only to the exemplary embodiment described above. It may be appreciated that the method of "creating message patterns using the list of pending messages" may be implemented using any other method.

Thereafter, the semantics engine 204 may classify the created message pattern, also referred as a new message pattern, as one of 'good' or 'bad'. The semantics engine 204 further classifies the SMS message 112 and the at least one pending message based on the classification and may remove the at least one pending message from the list of pending messages. Further, the semantics engine 204 may update the database 108 to include the new message pattern under one of the 'whitelist' patterns or the 'blacklist' patterns based on the received classification.

On the other hand, if the similarity value of the SMS message 112 does not exceed the predetermined threshold score when compared with any pending message of the list of pending messages, the semantics engine 204 may update the list of pending messages by appending the SMS message 112.

In some embodiments, the semantics engine 204 may also dynamically update the classification of the message pattern of the SMS message 112 based on the classifications of the sender reputation engine 208 and the CTA engine 206 during investigation of the SMS message 112. The CTA engine 206 is configured to parse the text of the SMS message 112 and extract one or more CTAs embedded within the SMS message 112. Further, the CTA engine 206 may classify if the one or more CTAs are 'good', 'bad' or 'unknown'. The CTAs may include, but not limited to, a Uniform Resource Locator (URL), a phone number, an email address, an Android® Application Package (APK), a short code, a link to access other web platforms and the like. Further, the CTA engine 206 compares the CTAs with predetermined CTA data 214 stored in the database 108. The predetermined CTA data 214 comprises, without limiting to, a plurality of whitelist CTAs and a plurality of blacklist CTAs. Further, the CTA engine 206 may classify the CTA as a 'good' CTA if the CTA corresponds to CTA listed under whitelisted CTAs in the database 108. Alternatively, the CTA engine 206 may classify the CTA as a 'bad' CTA if the CTA corresponds to a CTA listed under blacklisted CTAs in the database 108. On the other hand, if the CTA does not match with any of the existing patterns in the database 108, the CTA engine 206 may classify the CTA as an 'unknown' CTA. After classification, the CTA engine 206 stores the classification of the one or more CTAs as CTA classification 220 in the memory 202.

In one embodiment, the CTA engine 206 may also classify the CTA using third party servers 110 such as, without limiting to, Google® API. In one embodiment, when the CTA is classified as 'unknown', the CTA engine 206 may send the 'unknown' CTA to the PDS administrator to manually evaluate if the CTA is 'good' or 'bad'. The PDS administrator may analyze the CTA manually to classify the CTA as 'good' or 'bad'. In some embodiments, the CTA engine 206 dynamically updates classification of one or more CTAs embedded within the SMS message 112 based on the classification output of the sender reputation engine 208 and the classification output of semantics engine 204 during investigation of the SMS message 112.

In another embodiment, the CTA engine 206 may classify a CTA by processing information on a website of the URL, if the CTA is a URL. Further, the CTA engine 206 may collect information related to a number of brand entities from the website. As an example, the information collected by the CTA engine 206 may include, but not limited to, one or more brand names, one or more brand images, one or more brand logos, and one or more URL domains of the brand entities. For example, the brand entities may be organizations like Facebook®, WhatsApp®, FedEx®, Google®. The CTA engine 206 may load the URL using a headless browser and capture a screenshot of the website of the URL. The CTA engine 206 may also extract or download one or more images from the website. Thereafter, the CTA engine 206 may extract text content from the screenshot, as well as one or more images, using predefined image processing techniques, such as, but not limited to, Optical Character Recognition (OCR).

Further, The CTA engine 206 may compare the text content with the one or more brand names. Further, the CTA engine 206 may compare the downloaded images of the website with one or more brand logos or one or more brand images of the brand entities, for example, using one or more image processing techniques such as Scale-Invariant Feature Transform (SIFT) and Homograph technique. The CTA engine 206 may further compare a URL domain of the URL with any of a plurality of URL domains of the brand entities.

Upon comparison, the CTA engine 206 may determine if the URL satisfies a set of predefined conditions. The set of predefined conditions may include identifying a brand name within the website, detecting that at least one brand logo associated with a brand entity is present on the website, and determining that the URL domain is different from a URL domain of the brand entity. In an example, the CTA engine 206 identifies whether a brand name (for example, Facebook®) is present in the text content, and determines whether any of the downloaded images matches with a brand logo (for example Facebook®) associated with the brand name.

Further, the CTA engine 206 also determines whether the URL domain of the URL (for example, "www.abcxyz.co/Facebook/") is different from an actual URL domain (for example, www.facebook.com), of the brand represented by the brand logo.

In an embodiment, based on outcome of determining whether the URL satisfies the set of predefined conditions, the CTA engine 206 may classify the URL as 'bad' if the URL satisfies the set of predefined conditions. In the above example, the CTA engine 206 classifies the URL as 'bad' since the website has the brand name and the brand logo, but the URL domain of the website is different from the original URL domain of the brand entity. On the other hand, when the CTA engine 206 determines that the URL does not satisfy the set of predefined conditions, the CTA engine 206 may classify the URL as 'good'. Consequently, if the CTA engine 206 determines that neither a brand name, nor a brand logo is present on the website and the URL domain of the URL is same as one of plurality of URL domains of a brand entity, the CTA engine 206 may analyse that the SMS message 112 is originating or sent from the genuine brand entity and may classify the URL as 'good'. In any other case, such as, but not limited to, if a brand name is present on the website, a brand logo/brand image is not present in the website and the URL domain is different from the URL of a brand entity, the CTA engine 206 may analyse the CTA using third party servers or with the help of the PDS administrator to classify the CTA as 'good', 'bad' or 'unknown'.

In an embodiment, the sender reputation engine 208 may evaluate a sender reputation score 221 for the sender 114 of the SMS message 112 and compare the sender reputation score 221 with the predetermined sender data 216 in the database 108. The sender reputation engine 208 may calculate the sender reputation score 221 for a sender header in an Application to Person (A2P) transmission of the SMS message 112, using one or more data associated with the sender 114. The sender header may indicate an enterprise that is sending the SMS message 112. As an example, the enterprise may include, without limiting to, a bank, sending an SMS message 112 from a bank server to a person, such as, without limiting to, a customer. The one or more data associated with the sender may include the sender header of the sender 114, an entity name of an entity associated with the sender 114, a telecom operator associated with the sender 114, a registration date of the sender header, average volume of SMS messages 112 sent from the sender header in a month, a number of complaints associated with the sender header, an industry category of the entity, a type of the SMS message 112, a template identifier of a predetermined message pattern that matches with the SMS message 112, a number of variables in the predetermined message pattern, and a percentage of a static message content in the SMS message 112.

The sender reputation engine 208 may calculate the sender reputation score 221 for a sender phone number, in a Person to Person (P2P) transmission of the SMS message 112, using one or more parameters of the sender 114. The sender phone number may be associated with a person (sender), who is sending the SMS message 112 to another person (receiver). The one or more parameters may include a longevity of the sender phone number, a number of SMS messages 112 sent from and received by the sender phone number, a number of A2P SMS messages 112 received on the sender phone number, a length of the SMS message 112, a type of the SMS message 112 such as, without limiting to, 'phishing' or 'genuine', and a telecom operator associated with the sender phone number.

After computing the sender reputation score 221 of the sender 114, the sender reputation engine 208 may compare the sender reputation score 221 with one or more score ranges stored as the predetermined sender reputation data 216 and classify the sender 114 as a 'bad' sender or a 'good' sender based on the comparison. The sender reputation engine 208 may classify the sender 114 as 'good' if the sender reputation score 221 falls within a first good score range. Alternatively, the sender reputation engine 208 may classify the sender 114 as 'bad' if the sender reputation score 221 falls within a second bad score range. In another embodiment, the sender reputation engine 208 may classify the sender 114 as 'unknown' if the sender reputation score 221 does not fall within the first score range or the second score range. The sender reputation engine 208 stores the classification of the sender 114 as sender classification 222 in the memory 202. In some embodiments, the sender reputation engine 208 dynamically updates classification of one or more senders 114 based on the classification of the CTA engine 206 and the classification of semantics engine 204 during investigation of the SMS message 112.

In an embodiment, the evaluation engine 209 may receive the message pattern classification 218, the CTA classification 220 and the sender classification 222 and may classify or detect the SMS message 112 as a 'phishing' message or a 'genuine' message. Accordingly, the evaluation engine 209 may detect that the SMS message 112 is a 'phishing' message when at least two of the message pattern classification 218, the sender classification 222 and the CTA classification 220 are 'bad' or when the sender classification 222 and the message pattern classification 218 is one of 'bad' and 'unknown', and the CTA classification 220 is 'bad'. Alternatively, the evaluation engine 209 may detect that the SMS message 112 is a 'genuine' message when at least two of the message pattern classification 218, the sender classification 222 and the CTA classification 220 are one of 'good' and 'unknown'. For example, if the message pattern is 'bad', the CTA is 'bad' or 'unknown' and the sender is 'good', the evaluation engine 209 classifies the SMS message 112 as a 'phishing' message. In another example, if the message pattern is 'good', the CTA is 'good' or 'unknown' and the sender is 'good', the evaluation engine 209 classifies the SMS message 112 as a 'genuine' message. Further, the evaluation engine 209 stores the classification of the SMS message 112 as 'phishing' message or 'genuine' message as message classification 224 in the memory 202.

In an embodiment, the evaluation engine 209 may be further configured to transmit an alert notification to the telecom server 106 indicating that the SMS message 112 is a 'phishing' message or a 'genuine' message. In some embodiments, the evaluation engine 209 may also transmit an alert notification to an intended recipient 118 of the SMS message 112 if the SMS message 112 is a 'phishing' message. Further, the evaluation engine 209 automatically blocks the SMS message 112 from being routed to the recipient 118 if the SMS message 112 is a 'phishing' message. Alternatively, when the SMS message 112 is a 'genuine' message, the evaluation engine 209 allows the SMS message 112 to be routed to the recipient 118. Thus, the evaluation engine 209 detects the 'phishing' messages and prevents phishing attacks by blocking any 'phishing' messages from being routed to respective intended recipients of the messages.

In an embodiment, the investigation engine 210 may investigate the SMS message 112 if the message pattern classification 218, the CTA classification 220 and the sender classification 222 of the SMS message 112 satisfy a first predefined investigation criterion and a second predefined criterion. As an example, the first predefined investigation criterion includes that at least two of the message pattern classification 218, the CTA classification 220 and the sender classification 222 are 'unknown'. Similarly, the second predefined investigation criterion may include that the sender classification 222 is 'good', and the message pattern classification 218 and the CTA classification 220 are either 'good' or 'unknown'. For example, if the message pattern, and the CTA are classified as 'unknown' and the sender is classified as 'bad', the investigation engine 210 may decide to investigate the SMS message 112. In another example, if the message pattern, and the CTA are 'good' and the sender is 'unknown', the investigation engine 210 does not investigate the SMS message 112.

Further, the investigation engine 210 may determine whether to investigate the message pattern of the message 112, the one or more CTAs of the message 112 or the sender of the message 112 based on the message pattern classification 218, the CTA classification 220 and the sender classification 222 of the message 112 respectively. For example, the investigation engine 210 determines to investigate a CTA of the message 112 if the message pattern classification 218 is 'bad', the CTA classification 220 is 'unknown' and the sender classification 222 is also 'bad'. In another example, the investigation engine 210 determines to investigate the sender of the message 112 if the CTA classification 220 is 'good', the message pattern classification is 'unknown' and the sender classification is 'bad'.

Further, the investigation engine 210 may investigate the SMS message 112 by monitoring that a number of similar or same SMS messages 112 have been received at the cellular gateway 103 from same or similar type of senders 114. For example, when the investigation engine 210 is investigating a 'good' sender who has sent a 'phishing' message, the investigation engine 210 may monitor all SMS messages sent by the same sender or a number of senders sending the same 'phishing' message. Here, the investigation engine 210 may initialize a message counter 226, in the memory 202, to monitor the number of the SMS messages. The message counter 226 may be incremented each time the SMS message 112 has been received from the same sender 114. In some embodiments, the investigation engine 210 increments the message counter 226 when the SMS message 112 is received from the same type or different type of sender 114, such as, without limiting to, 'good' sender, 'bad' sender or 'unknown' sender. The investigation engine 210 may also monitor one or more SMS messages sent by the sender 114.

Figure 3A:
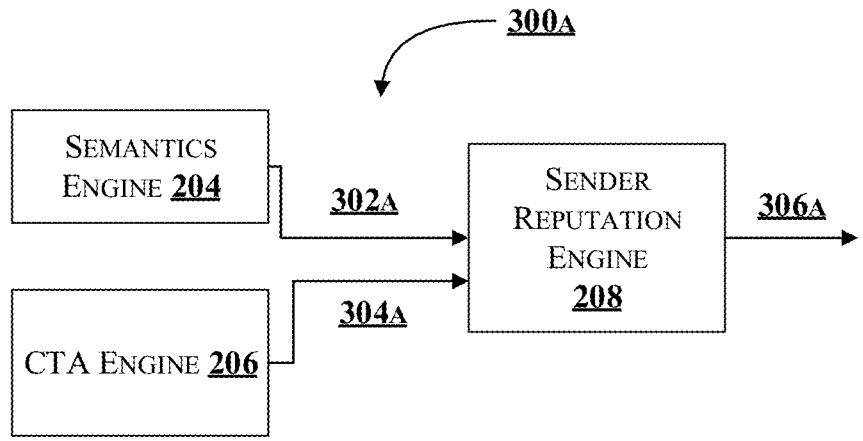
FIG. 3a-3c illustrate exemplary data flow diagrams of a method for dynamically updating classifications of a sender, a CTA, and a message pattern of an SMS message, in accordance with an embodiment of the present disclosure.
Figure 3B:
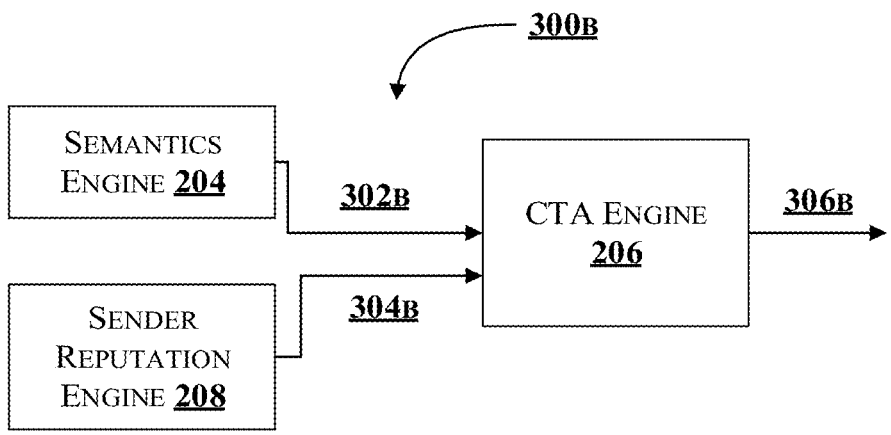
Figure 3C:
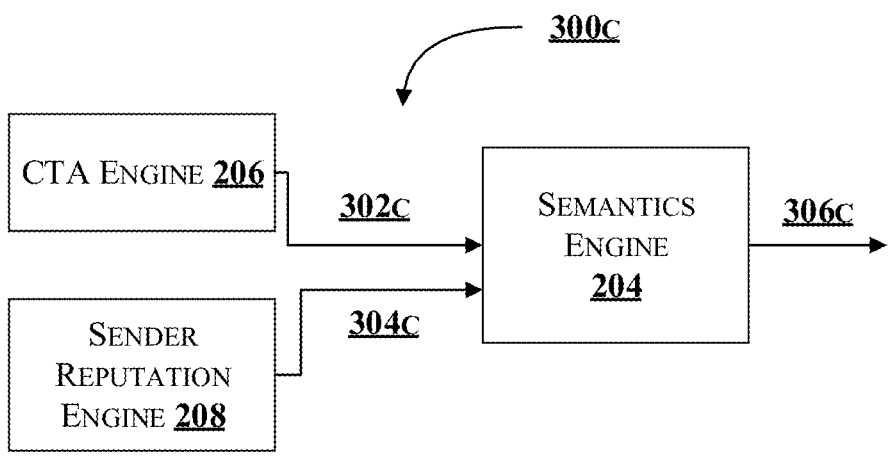

Further, the investigation engine 210 may dynamically update one or more of the message pattern classification 218, the CTA classification 220 and the sender classification 222 based on one or more of the other classifications obtained from the investigation. In one embodiment, the investigation engine 210 may dynamically update the sender classification 222 based on the message pattern classification 218 and the CTA classification 220, as illustrated in FIG. 3a. In another embodiment, the investigation engine 210 may dynamically update the CTA classification 220 based on the message pattern classification 218 and the sender classification 222, as illustrated in FIG. 3b. In a further embodiment, the investigation engine 210 may dynamically update the message pattern classification 218 based on the CTA classification 220 and the sender classification 222, as illustrated in FIG. 3c. A detailed explanation of modification of the classifications is provided below with references to FIGS. 3a-3c.

FIG. 3a illustrates a data flow diagram for a method for dynamically updating the sender classification 222 of the SMS message 112 upon investigation.

In some embodiments, the investigation engine 210 may monitor a predetermined number of times the sender 114 has sent a message for every predetermined time period and may dynamically update the classification 306A of the sender 114 based on the classification 302A of the semantics engine 204 and the classification 304A of the CTA engine 206. The predetermined number of times and the predetermined time period may be determined based on the classifications of the semantics engine 204, the CTA engine 206 and the sender reputation engine 208. For example, the investigation engine 210 modifies the sender classification 222 from 'bad' to 'good', if the sender 114 has not sent any 'phishing' message in the last 25 days (i.e., predetermined time period). In another example, the investigation engine 210 the sender classification 222 from 'good' tot 'bad', when the sender who is previously classified as the 'good' sender has sent one or more 'phishing' messages for 25 times (i.e., the predetermined number of times) in 2 days (i.e., predetermined time period), 50 times in next 2 days, and 70 times in further 2 days. Alternatively, the investigation engine 210 may dynamically update the sender classification 222 from 'bad' to 'good'. Similarly, the investigation engine 210 may dynamically update the sender classification 222 from 'good' to 'bad', or 'unknown' to either 'good' or 'bad' or 'bad' to 'good' based on classification of a number of messages sent by the sender 114 over the predetermined time period.

In some embodiments, the investigation engine 210 may monitor one or more messages 112 sent by the sender 114, such as, but not limited to, a 'unknown' sender, over the predetermined time period and may dynamically update the sender classification 222 of the sender 114. In one example, if an 'unknown' sender has sent a 'bad' message pattern and a 'bad' CTA in last 2 days, the investigation engine 210 may dynamically update the sender classification 222 from 'unknown' to 'bad'. In another example, if the 'unknown' sender has not sent any message with a 'bad' message pattern and/or a 'bad' CTA in the last 25 days, the investigation engine 210 may dynamically update the sender classification 222 of the sender 114 from 'unknown' to 'good'. Similarly, the investigation engine 210 may dynamically update the sender classification 222 periodically for every predetermined time period.

In one embodiment, the investigation engine 210 may classify a plurality of senders into a number of classifications such as, without limiting to, 'highly likely good', 'less likely good', 'less likely bad', 'highly likely bad' etc., based on the sender reputation score 221 of the plurality of 'bad' senders. In this embodiment, the investigation engine 210 may dynamically update the sender classification 222 as 'highly likely good', 'likely good', 'less likely good', 'less likely bad', or 'highly likely bad' based on the classifications of the semantics engine 204 and the CTA engine 206 for one or more messages sent by the sender 114 over the predetermined time period. For example, upon determination that a 'less likely bad' sender has not sent any message with a bad message pattern and/or a bad CTA in the last 25 days, the investigation engine 210 may dynamically update the sender classification 222 from 'less likely bad' to 'less likely good'. In another example, upon determination that the 'less likely bad' sender has sent one or more messages with bad message pattern and/or a bad CTA within 2 days, the investigation engine 210 may dynamically update the sender classification 222 from 'less likely bad' to 'highly likely bad'.

In another example, when a 'highly likely good sender' has sent an 'unknown' message pattern 302A and an 'unknown' CTA 304A, the investigation engine 210 modifies the classification 306A of the sender 114 from 'highly likely good' to 'less likely good'. In other examples, when an 'unknown' sender sends a 'bad' message pattern 302A and/or a 'bad' CTA 304A within 2 days for 25 times, the investigation engine 210 may dynamically update the classification 306A of the sender 114 from 'unknown' to 'less likely bad'. In this example, if the 'less likely bad' sender 114 sends a 'bad' message pattern 302A and/or a 'bad' CTA 304A within 2 days for 50 times, the investigation engine 210 may dynamically update the classification 306A of the sender 114 from 'less likely bad' to 'highly likely bad'.

In some other embodiments, the investigation engine 210 may dynamically update the classification of the sender 114 based on length of the SMS message 112 and presence of a CTA in the SMS message 112. In these embodiments, the investigation engine 210 may determine if a sender 114 sends a message of a predetermined length for a predetermined number of times. The predetermined length may be determined based on an average length of 'phishing' messages encountered previously. The predetermined number of times may be determined based on a maximum number of times the message 112 may be allowed to be routed to recipients without any threat of 'phishing'. In one example, the investigation engine 210 detects if a 'good' sender 114 has sent an 'unknown' message pattern 302A comprising at least one 'unknown' CTA 304A, with a length of more than 200 characters for 25 times. Upon successful detection, the investigation engine 210 may dynamically update the classification of the sender 114, for example, from 'unknown' to 'bad'. In these embodiments, the investigation engine 210 may also dynamically update the message pattern classification 218 and the CTA classification 220.

The classifications of sender as 'highly likely good', 'likely good', 'less likely good', 'less likely bad', or 'highly likely bad' are only illustrative and there may exist other types of classifications or a number of classifications to dynamically update the classification of the sender 114.

FIG. 3b illustrates a data flow diagram for a method for dynamically updating the CTA classification 220 of the SMS message 112 upon investigation.

The investigation engine 210 may receive the message pattern classification 302B of the semantics engine 204 and the sender classification 304B from the sender reputation engine 208 and may dynamically update the CTA classification 306B of the CTA engine 206. In these embodiments, the investigation engine 210 may determine to investigate the message 112 whose CTA is classified as 'unknown' or 'bad' or 'good' and dynamically update the CTA classification 220. In these embodiments, the investigation engine 210 may count if a predetermined number of messages, whose message pattern classification, CTA classification and the sender classification are same as the message pattern classification 218 and the sender classification 222 of the message 112, have been received. Upon successful determination, the investigation engine 210 may dynamically update the CTA classification 220 of the message 112 according to the message pattern classifications and the sender classifications of the predetermined number of messages.

For example, when the investigation engine 210 investigates a message 112 with an 'unknown' CTA, a 'bad' message pattern and a 'bad' sender, the investigation engine 210 may monitors 200 messages each with 'bad' message pattern, 'unknown' CTA received from a 'bad' sender. Further, the investigation engine 210 may dynamically update the CTA classification 306B as 'bad' since the message pattern classification 302B and the sender classification 304B of all the predetermined number of messages are 'bad'.

FIG. 3c illustrates a data flow diagram for a method for dynamically updating the message pattern classification 218 of the SMS message 112 upon investigation.

The investigation engine 210 may receive the CTA classification 302C of the CTA engine 206 and the sender classification 304C from the sender reputation engine 208 and may dynamically update the message pattern classification 306C of the semantics engine 204. In these embodiments, the investigation engine 210 may determine to investigate the message 112, whose message pattern is classified as 'unknown' or 'bad' or 'good' and dynamically update the message pattern classification 218. In these embodiments, the investigation engine 210 may count if a predetermined number of messages, whose message pattern classification, CTA classification and the sender classification are same as the message pattern classification 218, CTA classification 220 and the sender classification 222 of the message 112, have been received. Upon successful determination, the investigation engine 210 may dynamically update the message pattern classification 218 of the message 112 based on the CTA classifications and the sender classifications.

For example, when the investigation engine 210 investigates a message 112 with an 'unknown' message pattern, a 'bad' CTA and a 'bad' sender, the investigation engine 210 may monitor 200 messages (i.e., predetermined number of messages), each with 'bad' CTA and 'unknown' message pattern, received from a 'bad' sender. Further, the investigation engine 210 may dynamically update the message pattern classification as 'bad' 306C if the CTA classification 302C and the sender classification 304C of all the 200 messages are 'bad'.

The investigation engine 210 may further dynamically update the detected classification of the message 112 as 'phishing' or 'genuine' based on the one or more modified classifications. For example, the investigation engine 210 may dynamically update the classification of a message, which was earlier classified as 'genuine' message to a 'phishing' message based on the modified classifications.

Figure 4:
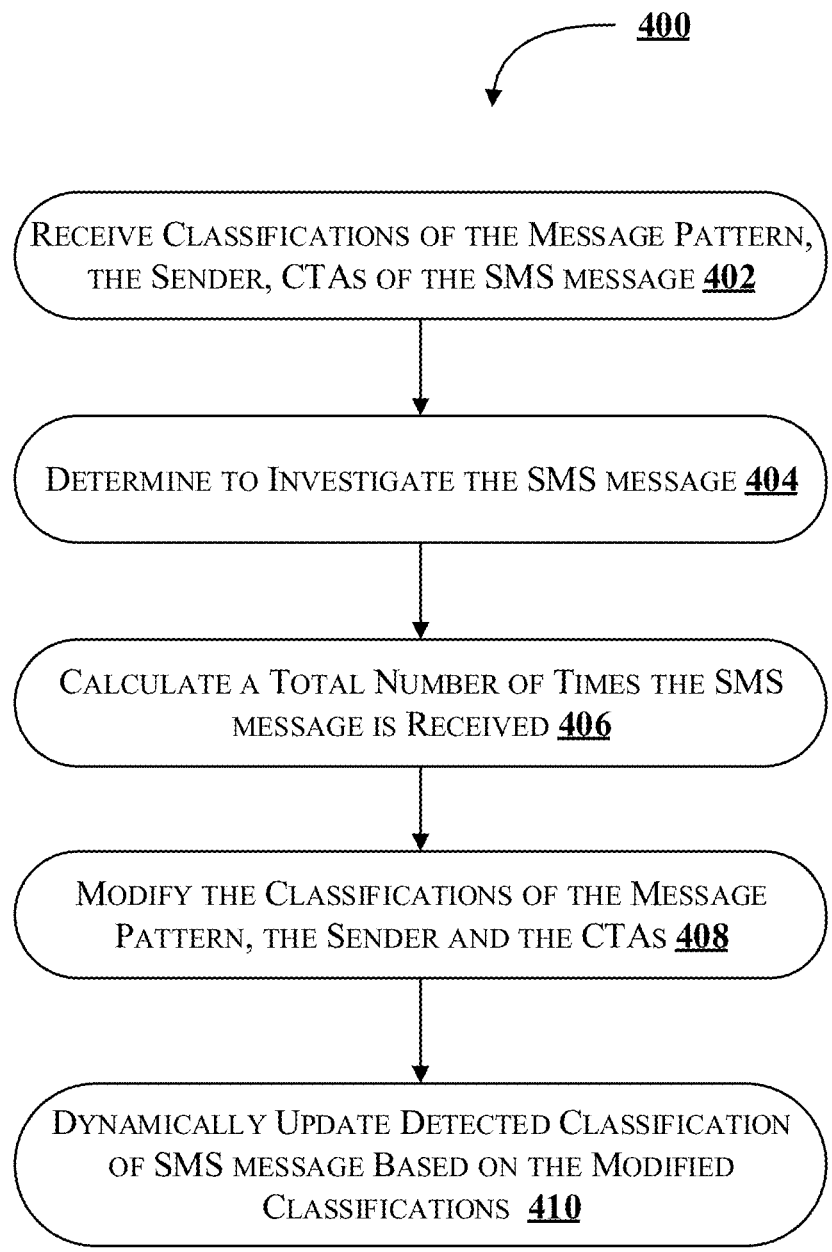
FIG. 4 shows an exemplary flowchart illustrating a method of detecting a phishing message in SMS communications in accordance with an embodiment of the present disclosure.

FIG. 4 shows an exemplary flowchart illustrating a method for investigating SMS messages in accordance with an embodiment of the present disclosure.

The method 400 may be described in the general context of computer executable instructions. Generally, computer executable instructions can include routines, programs, objects, components, data structures, procedures, modules, and functions, which perform specific functions or implement specific abstract data types.

The order in which the method 400 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At step 402, the PDS 102 receives a message pattern classification 218, the CTA classification 220 and the sender classification 222 of the SMS message 112.

At step 404, the PDS 102 determines whether to investigate the SMS message 112 by determining if the classifications satisfy a first predefined investigation criterion or a second predefined criterion. As an example, the first predefined investigation criterion includes that at least two of the message pattern classification 218, the CTA classification 220 and the sender classification 222 are 'unknown'. The second predefined investigation criterion includes that the sender classification 222 is 'good', and the message pattern classification 218 and the CTA classification 220 are 'good' or 'unknown'.

At step 406, upon successful determination that the SMS message 112 satisfies either the first investigation criterion, or the second investigation criterion, the PDS 102 monitors a number of times the SMS message 112 has been received from the same sender 114 or a different sender over a predetermined time period. The PDS 102 may calculate the number of times the SMS message has been received.

At step 408, the PDS 102 may dynamically update one or more of the message pattern classification 218, CTA classification 220 and the sender classification 222 of the SMS message if the SMS message has been received for the predetermined number of times.

At step 410, the PDS 102 dynamically updates the detected classification 224 of the message 112 as 'phishing' or 'genuine' based on the one or more modified classifications. For example, the PDS 102 classifies a 'genuine' message as a 'phishing' message based on the modified classifications.

Thus, the PDS 102 optimizes detection of the 'phishing' messages by dynamically updating the classifications of the message pattern, CTA and sender of messages and dynamically updating message classification, which improves accuracy of 'phishing' on a long run. Such a method of dynamically updating the classification by investigation may help in greatly reducing false positives and false negatives, which may generally occur in case of one-time classification. The investigation method thus escalates reliability of the PDS 102 for detecting phishing attacks by not only detecting 'phishing', but also dynamically updating the message classification.

Figure 5:
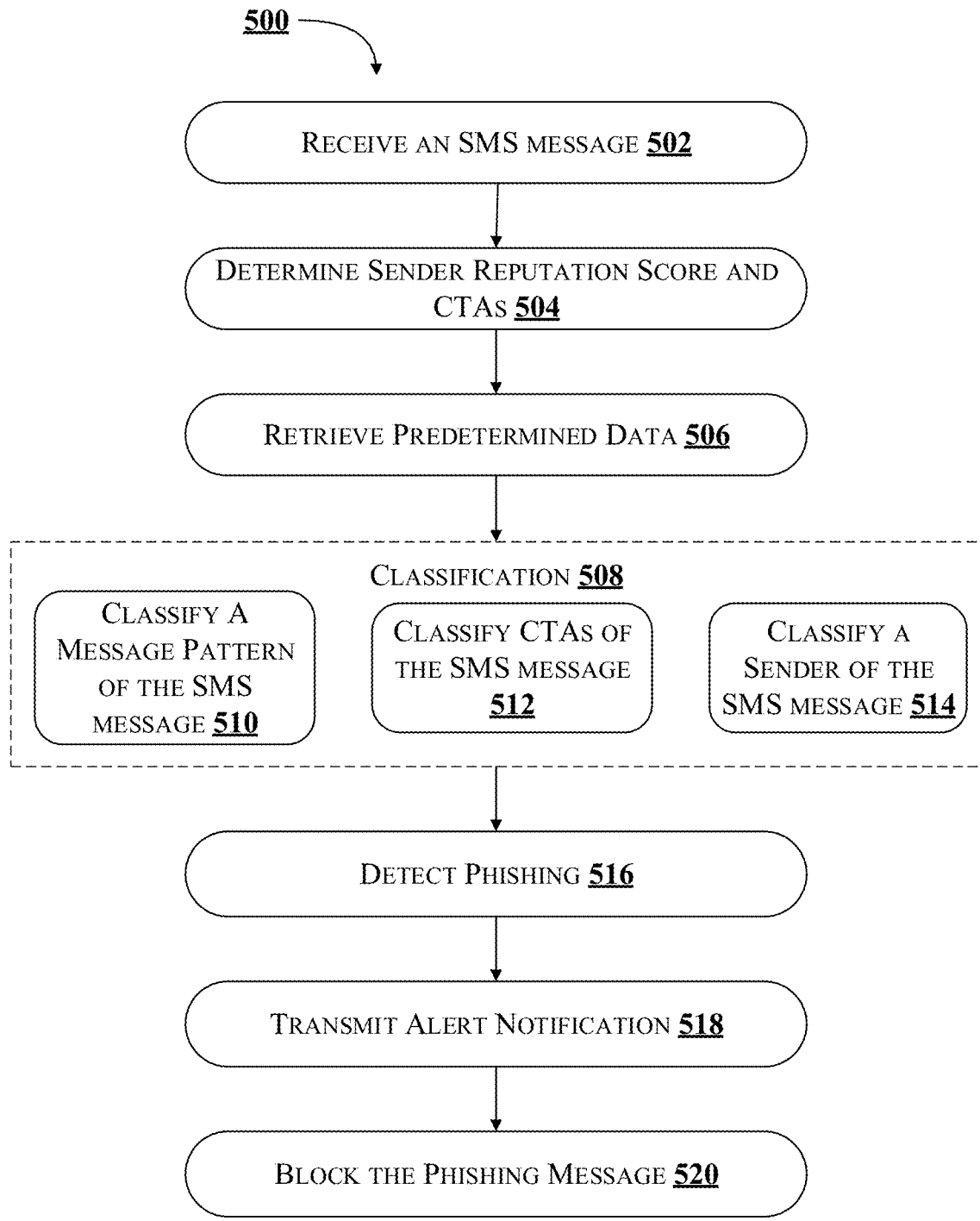
FIG. 5 shows an exemplary flowchart illustrating a method of investigating SMS messages in accordance with an embodiment of the present disclosure.

FIG. 5 shows an exemplary flowchart illustrating a method to detect a 'phishing' message in SMS communications in accordance with an embodiment of the present disclosure.

The method 500 may be described in the general context of computer executable instructions. Generally, computer executable instructions can include routines, programs, objects, components, data structures, procedures, modules, and functions, which perform specific functions or implement specific abstract data types.

The order in which the method 500 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At step 502, the PDS 102 receives an SMS message 112 from a sender 114 at the cellular gateway 103.

At step 504, the PDS 102 determines a sender reputation score 221 of the sender 114 and extracts one or more CTAs embedded within the SMS message 112.

At step 506, the PDS 102 retrieves predetermined message pattern data 212, predetermined CTA data 214, and predetermined sender reputation data 216 from the database 108.

At step 508, the PDS 102 classifies each of a message pattern, the sender and the CTA as 'good', 'bad' or 'unknown'.

At step 510, the PDS 102 compares the SMS message 112 to the plurality of predetermined message patterns within the predetermined message pattern data 212 and may classify the message pattern as 'good' if the SMS message 112 matches with a whitelist message pattern of the predetermined message pattern data 212. The PDS 102 may classify the message pattern as a 'bad' pattern if the SMS message 112 matches with a blacklist message pattern in the predetermined message pattern data 212. The semantics engine 204 may classify the message pattern as an 'unknown' pattern if the SMS message 112 does not match with any of the existing patterns in the predetermined message pattern data 212.

At step 512, the PDS 102 compares the one or more CTAs embedded within the SMS message 112 to the predetermined CTA data 214 and may classify the CTA as 'good' if the CTA corresponds to a whitelist CTA of the predetermined CTA data 214. The PDS 102 may classify the CTA as a 'bad' CTA if the CTA corresponds to a blacklist CTA in the predetermined CTA data 214. The PDS 102 may classify the CTA as an 'unknown' CTA if the CTA does not match with any of the existing CTAs in the predetermined CTA data 214.

At step 514, the PDS 102 compares the sender of the SMS message 112 to the predetermined sender reputation data 216 and may classify the sender as 'good' if the sender reputation score 221 falls within a first score range The PDS 102 may classify the sender as a 'bad' sender if the sender reputation score 221 falls within a second score range. The PDS 102 may classify the sender as an 'unknown' sender if the sender reputation score 221 falls within a third score range.

At step 516, the PDS 102 may detect that the SMS message 112 is a 'phishing' message when the classification of at least two of the message pattern, the sender and the one or more CTAs are 'bad' or the classification of the sender 114 and the message pattern is one of 'bad' and 'unknown', and the classification of the one or more CTAs are 'bad'. The PDS 102 may detect that the SMS message is a 'genuine' message when the SMS message 112 is not a 'phishing' message and the classification of at least two of the message pattern, the sender 114 and the one or more CTAs are one of 'good' and 'unknown'.

At step 518, the PDS 102 transmits an alert notification to the telecom server 106 indicating that the SMS message 112 is a 'phishing' message or a 'genuine' message.

At step 520, the PDS 102 automatically blocks the SMS message 112 from being routed to the recipient 118 if the SMS message 112 is a 'phishing' message. Similarly, when the SMS message 112 is a 'genuine' message, the PDS 102 allows the SMS message 112 to be sent to the recipient 118.

Thus, the PDS 102 enables a telecom operator to detect a number of 'phishing' messages efficiently and quickly even before routing and delivering the messages to the recipient, so that the telecom operator can take an informed and timely decision whether to route the message to the recipient or not. Also, since the PDS 102 may be installed directly at the cellular gateway 103, it makes it highly advantageous and accurate to determine if a message is 'phishing' and then automatically block the message from being routed to the recipients. Thus, the PDS 102 helps in detecting and mitigating phishing attacks on a larger scale.

Figure 6:
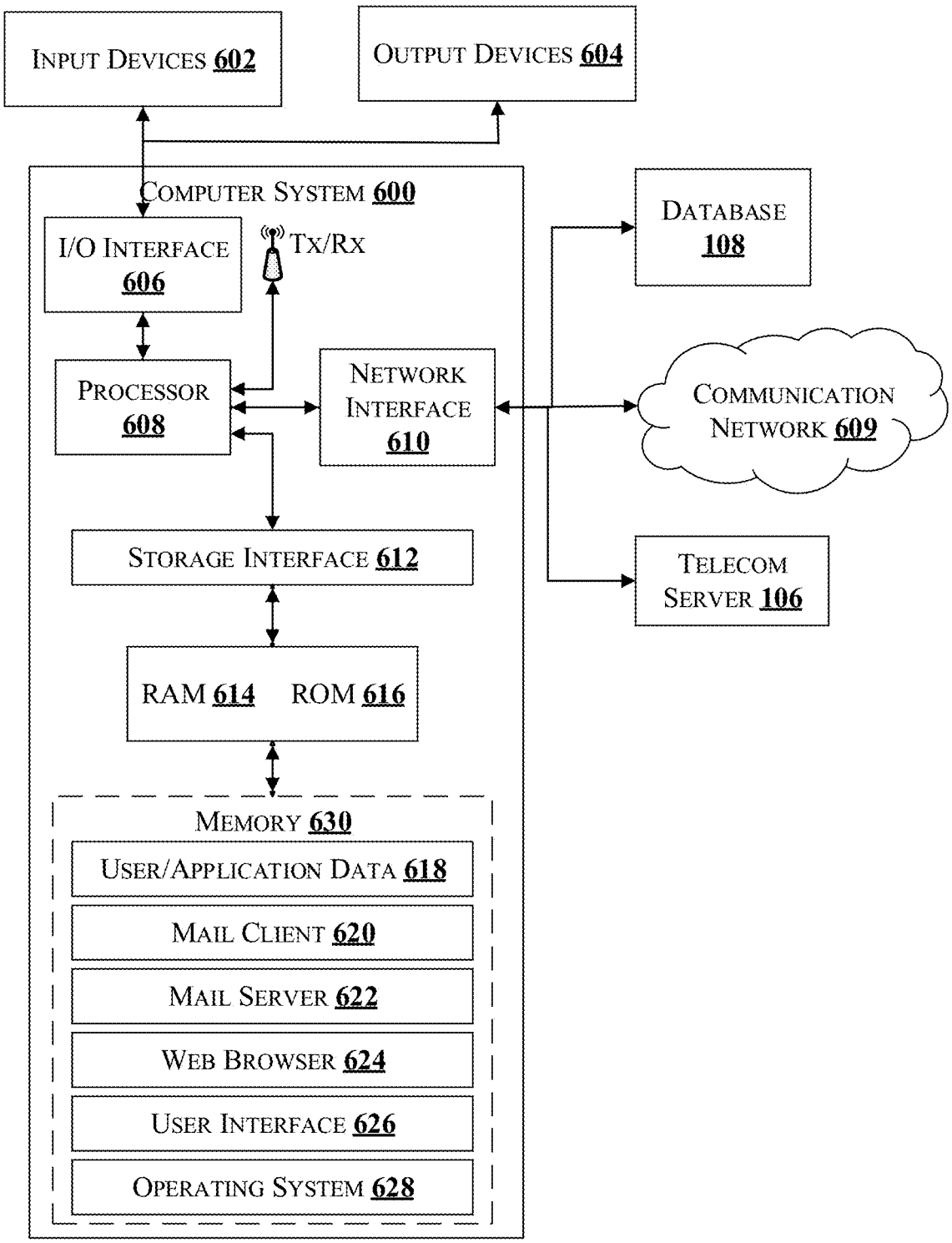
FIG. 6 illustrates an exemplary computer system for implementing embodiments consistent with the present disclosure.

FIG. 6 illustrates a block diagram of an exemplary computer system for implementing embodiments consistent with the present disclosure.

In an embodiment, the computer system 600 may be the phishing detection system 102, used for detecting phishing attacks in Short Message Service (SMS) communications. The computer system 600 may include a central processing unit ('CPU' or 'processor') 608. The processor 608 may comprise at least one data processor for executing program components for executing user or system-generated business processes. The processor 608 may include specialized processing units such as, without limiting to, integrated system (bus) controllers, memory management control units, floating point units, graphics processing units, digital signal processing units, etc.

The processor 608 may be disposed in communication with one or more Input/Output (I/O) devices 602 and 604 via I/O interface 606. The I/O interface 606 may employ communication protocols/methods such as, without limitation, audio, analog, digital, stereo, IEEE-1694, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc.

Using the I/O interface 606, the computer system 600 may communicate with one or more I/O devices 602 and 604. In some implementations, the processor 608 may be disposed in communication with a communication network 609 via a network interface 610. The network interface 610 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 610, the computer system 600 may be connected to the telecom server 106, the database 108 and the communication network 609.

The communication network 609 can be implemented as one of the several types of networks, such as, without limiting to, intranet or any such wireless network interfaces. The communication network 609 may either be a dedicated network or a shared network, which represents an association of several types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 609 may include a variety of network devices, including routers, bridges, servers, computing devices, storage devices, etc.

In some embodiments, the processor 608 may be disposed in communication with a memory 630 e.g., RAM 614, and ROM 616, etc. as shown in FIG. 6, via a storage interface 612. The storage interface 612 may connect to memory 630 including, without limitation, memory drives, removable disc drives, etc., employing connection protocols such as, without limiting to, Serial Advanced Technology Attachment (SATA), Integrated Drive Electronics (IDE), IEEE-1694, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 630 may store a collection of program or database components, including, without limitation, user/application 618, an operating system 628, a web browser 624, a mail client 620, a mail server 622, a user interface 626, and the like. In some embodiments, computer system 600 may store user/application data 618, such as, without limiting to, the data, variables, records, etc. as described in this invention. Such databases may be implemented as fault-tolerant, relational, scalable, secure databases such as, without limiting to, Oracle or Sybase.

The operating system 628 may facilitate resource management and operation of the computer system 600. Examples of operating systems include, without limitation, Apple Macintosh™ OS X™, UNIX™, Unix-like system distributions (e.g., Berkeley Software Distribution (BSD), FreeBSD™, Net BSD™, Open BSD™, etc.), Linux distributions (e.g., Red Hat™ Ubuntu™ K_Ubuntu™, etc.), International Business Machines (IBM™) OS/2™, Microsoft Windows™ (XP™ Vista/7/8, etc.), Apple iOS™, Google Android™, Blackberry™ Operating System (OS), or the like. A user interface may facilitate display, execution, interaction, manipulation, or operation of program components through textual or graphical facilities. For example, user interfaces may provide computer interaction interface elements on a display system operatively connected to the computer system 600, such as, without limiting to, cursors, icons, check boxes, menus, windows, widgets, etc. Graphical User Interfaces (GUIs) may be employed, including, without limitation, Apple™ Macintosh™ operating systems' Aqua™ IBM™ OS/2™, Microsoft™ Windows™ (e.g., Aero, Metro, etc.), Unix X-Windows™, web interface libraries (e.g., ActiveX, Java, JavaScript, AJAX, HTML, Adobe Flash, etc.), or the like.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed.

Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words 'comprising,' 'having,' 'containing,' and 'including,' and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms 'a', 'an,' and 'the' include plural references unless the context clearly dictates otherwise.

Finally, the language used in the specification has been principally selected for readability and instructional purposes, and it may not have been selected to delineate or circumscribe the inventive subject matter. Accordingly, the disclosure of the embodiments of the disclosure is intended to be illustrative, but not limiting, of the scope of the disclosure.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

| Referral Numerals: | |
|---|---|
| Reference Number | Description |
| 100 | System |
| 102 | Phishing Detection System |
| 103 | Cellular Gateway |
| 104 | Cellular Communication Network |
| 106 | Telecom server |
| 108 | Database |
| 110 | Third party servers |
| 112 | SMS message |
| 114 | Sender |
| 116 | First user device |
| 118 | Recipient |
| 120 | Second user device |
| 201 | Processor |
| 202 | Memory |
| 203 | Modules |
| 204 | Semantics engine |
| 206 | CTA engine |
| 208 | Sender reputation engine |
| 209 | Evaluation engine |
| 210 | Investigation engine |
| 212 | Predetermined message pattern data |
| 214 | Predetermined CTA data |
| 216 | Predetermined sender reputation data |
| 218 | Message pattern classification |
| 220 | CTA classification |
| 222 | Sender classification |
| 224 | Message classification |
| 226 | Message counter |
| 600 | Computer system |
| 602 | Input devices |
| 604 | Output devices |
| 606 | Input/Output interface of the computer |
| 608 | Processor of the computer system |
| 609 | Communication network |
| 610 | Network interface |
| 612 | Storage interface |
| 614 | RAM |
| 616 | ROM |
| 618 | User/Application data |
| 620 | Mail client |
| 622 | Mail server |
| 624 | Web browser |
| 626 | User interface |
| 628 | Operating system |
| 630 | Memory of the computer |

I claim:

1. A method for detecting phishing attacks in Short Message Service (SMS) communications, the method comprising:
   determining, by a phishing detection system, a sender reputation score of a sender of an SMS message and Call To Action (CTA) data embedded in the SMS message;
   retrieving, by the phishing detection system, via a communication network, a pre-determined message pattern data, pre-determined sender reputation data, and pre-determined CTA data from a database associated with the phishing detection system;
   classifying, by the phishing detection system, each of a message pattern, the sender, and the CTA data as one of good, bad and unknown based on a comparison with the pre-determined message pattern data, the pre-determined sender reputation data, and the pre-determined CTA data;
   detecting, by the phishing detection system, that the SMS message is one of a phishing message and a genuine message based on the classifications of the message pattern, the sender, and the CTA data;
   transmitting, by the phishing detection system, via a cellular communication network, an alert notification to a telecommunication server, upon detecting the SMS message is the phishing message;
   automatically blocking, by the phishing detection system, the phishing message from being delivered to a recipient; and
   wherein detecting the SMS message as the phishing message when one of:
      the classification of at least two of the message pattern, the sender and the CTA data is bad; and
      the classification of the sender and the message pattern is one of bad and unknown, and the classification of the CTA data is bad.

2. The method as claimed in claim 1, wherein the classifying further comprising:
   comparing, by the phishing detection system, the SMS message with the pre-determined message pattern data, wherein the pre-determined message pattern data comprises a set of pre-determined whitelisted message patterns and a set of pre-determined blacklisted message patterns; and
   classifying, by the phishing detection system, the message pattern as one of:
      good, when the SMS message matches with a pre-determined whitelisted message pattern;
      bad, when the SMS message matches with a pre-determined blacklisted message pattern; and
      unknown, when the SMS message does not match with any of the pre-determined message pattern data.

3. The method as claimed in claim 1, wherein determining the sender reputation score, by the phishing detection system, further comprising, evaluating the sender reputation score of the sender:
   based on one or more parameters including a sender header of the sender, an entity name of an entity associated with the sender, a telecom operator associated with the sender, a registration date of the sender header, average volume of SMS messages sent from the sender header in a month, a number of complaints associated with the sender header, an industry category of the entity, a type of the SMS message, a template identifier of a predetermined message pattern that matches with the SMS message, a number of variables in the matched predetermined message pattern, and a percentage of a static message content in the SMS message, in an Application to Person (A2P) transmission of the SMS message; and
   based on one or more parameters including a longevity of a sender phone number of the sender, a number of SMS messages sent from the sender phone number, a number of SMS messages received on the sender phone number, a number of A2P SMS messages received on the sender phone number, a length of the SMS message, a type of the SMS message, and a telecom operator associated with the sender phone number in a Person to Person (P2P) transmission of the SMS message.

4. The method as claimed in claim 1, wherein the classifying further comprising:
comparing, by the phishing detection system, the sender reputation score with the pre-determined sender reputation data, wherein the pre-determined sender reputation data comprises a first score range, a second score range and a third score range; and
classifying, by the phishing detection system, the sender as one of:
good, when the sender reputation score falls within the first score range;
bad, when the sender reputation score falls within the second score range; and
unknown, when the sender reputation score falls within the third score range.

5. The method as claimed in claim 1, wherein the classifying further comprising:
comparing, by the phishing detection system, each of one or more CTAs of the CTA data with the pre-determined CTA data, wherein the pre-determined CTA data comprises a set of pre-determined whitelisted CTAs and a set of pre-determined blacklisted CTAs; and
classifying, by the phishing detection system, each of the one or more CTAs as one of good if the CTA matches with a pre-determined whitelisted CTA, bad if the CTA matches with a pre-determined blacklisted CTA, and unknown if the CTA does not match with any of the pre-determined CTAs.

6. The method as claimed in claim 5, wherein classifying each of the one or more CTAs further comprising:
determining that the one or more CTAs comprise a Uniform Resource Locator (URL); and
classifying the one or more CTAs as one of good and bad, based on a set of predefined conditions, wherein the set of predefined conditions comprise:
identifying whether a name of at least one brand entity is present on a website associated with the URL;
detecting whether at least one logo associated with the at least one brand on the website; and
determining whether a URL domain of the URL is different from a URL domain associated the at least one brand entity.

7. The method as claimed in claim 1, wherein detecting that the SMS message is the genuine message when:
the SMS message is not detected as the phishing message, and
the classification of at least two of the message pattern, the sender and the CTA data is one of good and unknown;
wherein in response to detecting that the SMS message is the genuine message, the method further comprising:
transmitting, by the phishing detection system, via the cellular communication network, the alert notification to the telecommunication server; and
automatically allowing, by the phishing detection system, the genuine message to be delivered to the recipient.

8. The method as claimed in claim 1, further comprising investigating, by the phishing detection system, the SMS message upon determining one of:
the classification of at least two of the message pattern, the sender and the CTA data is unknown; and
the classification of the message pattern and the CTA data is one of good and unknown and the classification of the sender is good; and
wherein the investigating comprises:
calculating a total number of times the SMS message is received at a cellular gateway;
dynamically updating the classification of one or more of the message pattern, the sender and the CTA data based on one or more predefined conditions related to the total number of times; and
dynamically updating a classification of the SMS message as one of phishing and genuine based on the dynamically updated classification.

9. The method as claimed in claim 8, wherein the one or more predefined conditions for dynamically updating the classification of the sender comprise:
determining, by the phishing detection system, that the total number of times is same as a first predefined number of times over a first predefined period of time; and
dynamically updating, by the phishing detection system, the classification of the sender based on the classification of the message pattern and the CTA data;
wherein the one or more predefined conditions for dynamically updating the classification of the message pattern comprise:
determining, by the phishing detection system, that the total number of times is same as a second predefined number of times over a second predefined period of time; and
dynamically updating, by the phishing detection system, the classification of the message pattern based on the classification of the sender and the CTA data;
wherein the one or more predefined conditions for dynamically updating the classification of the CTA data comprise:
determining, by the phishing detection system, that the total number of times is same as a third predefined number of times over a third predefined period of time; and
dynamically updating, by the phishing detection system, the classification of the CTA data of the SMS message based on the classification of the sender and the message pattern.

10. A system for detecting phishing attacks in Short Message Service (SMS) communications comprising:
a memory; and
a processor communicatively coupled with the memory, the processor is configured to:
determine a sender reputation score of a sender of an SMS message and Call To Action (CTA) data embedded in the SMS message;
retrieve, via a communication network, pre-determined message pattern data, pre-determined sender reputation data, and pre-determined CTA data from a database associated with the phishing detection system;
classify each of a message pattern, the sender, and the CTA data as one of good, bad and unknown based on a comparison with the pre-determined message pattern data, the pre-determined sender reputation data, and the pre-determined CTA data;
detect that the SMS message is one of a phishing message and a genuine message based on the classifications of the message pattern, the sender, and the CTA data;
transmit, via a cellular communication network, an alert notification to a telecommunication server, upon detecting the SMS message is the phishing message;

automatically block the phishing message from being delivered to a recipient; and wherein the processor is configured to detect the SMS message as a phishing message when one of:
the classification of at least two of the message pattern, the sender and the CTA data is bad; and
the classification of the sender and the message pattern is one of bad and unknown, and the classification of the CTA data is bad.

11. The system as claimed in claim 10, wherein for classifying the message pattern, the processor is further configured to:
compare the SMS message with the pre-determined message pattern data, wherein the pre-determined message pattern data comprises a set of pre-determined whitelisted message patterns and a set of pre-determined blacklisted message patterns; classify the message pattern as one of:
good, when the SMS message matches with a pre-determined whitelisted message pattern;
bad, when the SMS message matches with a pre-determined blacklisted message pattern; and
unknown, when the SMS message does not match with any of the pre-determined message pattern data.

12. The system as claimed in claim 10, wherein for determining the sender reputation score, the processor is further configured to evaluate the sender reputation score of the sender:
based on one or more of parameters including a sender header of the sender, an entity name of an entity associated with the sender, a telecom operator associated with the sender, a registration date of the sender header, average volume of SMS messages sent from the sender header in a month, a number of complaints associated with the sender header, an industry category of the entity, a type of the SMS message, a template identifier of a predetermined message pattern that matches with the SMS message, a number of variables in the matched predetermined message pattern, and a percentage of a static message content in the SMS message, in an Application to Person (A2P) transmission of the SMS message; and
based on one or more parameters including a longevity of a sender phone number of the sender, a number of SMS messages sent from the sender phone number, a number of SMS messages received on the sender phone number, a number of A2P SMS messages received on the sender phone number, a length of the SMS message, a type of the SMS message, and a telecom operator associated with the sender phone number, in a Person to Person (P2P) transmission of the SMS message.

13. The system as claimed in claim 10, wherein for classifying the sender, the processor is configured to:
compare the sender reputation score with the pre-determined sender reputation data, wherein the pre-determined sender reputation data comprises a first score range, a second score range and a third score range; and
classify the sender as one of:
good, when the sender reputation score falls within the first score range;
bad, when the sender reputation score falls within the second score range; and
unknown, when the sender reputation score falls within the third score range.

14. The system as claimed in claim 10, wherein to classify the CTA data, the processor is configured to:
compare each of one or more CTAs of the CTA data with the pre-determined CTA data, wherein the pre-determined CTA data comprises a set of pre-determined whitelisted CTA and a set of pre-determined blacklisted CTA; and
classify each of the one or more CTAs as one of good if the CTA matches with a pre-determined whitelisted CTA, bad if the CTA matches with a pre-determined blacklisted CTA, and unknown if the CTA does not match with any of the pre-determined CTAs.

15. The system as claimed in claim 14, wherein for classifying each of the one or more CTAs, the processor is further configured to:
determine that the one or more CTAs comprise a Uniform Resource Locator (URL) and;
classify the one or more CTAs as one of good and bad, based on a set of predefined conditions,
wherein the set of predefined conditions comprise:
identifying whether a name of at least one brand entity is present on a website associated with the URL;
detecting whether at least one logo associated with the at least one brand entity is present on the website; and
determining whether a URL domain of the URL is different from a URL domain associated the at least one brand entity.

16. The system as claimed in claim 15, wherein the processor is configured to detect that the SMS message is the genuine message
when:
the SMS message is not a phishing message, and
the classification of at least two of the message pattern, the sender and the CTA data is one of good and unknown;
wherein in response to detecting the SMS message is the genuine message, the processor is further configured to:
transmit, via the cellular communication network, the alert notification to the telecommunication server; and
automatically allow the genuine message to be delivered to the recipient.

17. The system as claimed in claim 10, the processor is further configured to investigate the SMS message upon determining one of:
the classification of at least two of the message pattern, the sender and the CTA data is unknown; and
the classification of the message pattern and the CTA data is one of good and unknown and the classification of the sender is good; and
wherein the processor investigates by:
calculating a total number of times the SMS message is received at a cellular gateway;
dynamically updating the classification of one or more of the message pattern, the sender and the CTA data based on one or more predefined conditions related to the total number of times; and
dynamically updating a classification of the SMS message as one of phishing and genuine based on the dynamically updated classification.

18. The system as claimed in claim 17, wherein the one or more predefined conditions for dynamically updating the classification of the sender comprise:
determining that the total number of times is same as a first predefined number of times over a first predefined period of time; and
dynamically updating the classification of the sender based on the classification of the message pattern and the CTA data;

wherein the one or more predefined conditions for dynamically updating the classification of the message pattern comprise:
  determining that the total number of times is same as a second predefined number of times over a second predefined period of time; and
  dynamically updating the classification of the message pattern based on the classification of the sender and the CTA data; and
wherein the one or more predefined conditions for dynamically updating the classification of the CTA data comprise:
  determining that the total number of times same as a third predefined number of times over a third predefined period of time; and
  dynamically updating the classification of the CTA data of the SMS message based on the classification of the sender and the message pattern.

19. A non-transitory computer-readable medium having program instructions stored thereon, when executed by a phishing detection system, facilitate the phishing detection system for detecting phishing attacks in Short Message Service (SMS) communications by performing operations comprising:
  determining a sender reputation score of a sender of an SMS message and Call To Action (CTA) data embedded in the SMS message;
  retrieving via a communication network, a pre-determined message pattern data, pre-determined sender reputation data, and pre-determined CTA data from a database associated with the phishing detection system;
  classifying each of a message pattern, the sender, and the CTA data as one of good, bad and unknown based on a comparison with the pre-determined message pattern data, the pre-determined sender reputation data, and the pre-determined CTA data;
  detecting that the SMS message is one of a phishing message and a genuine message based on the classifications of the message pattern, the sender, and the CTA data;
  transmitting via a cellular communication network, an alert notification to a telecommunication server, upon detecting the SMS message is the phishing message;
  automatically blocking the phishing message from being delivered to a recipient; and
  detecting the SMS message as the phishing message when one of:
    the classification of at least two of the message pattern, the sender and the CTA data is bad; and
    the classification of the sender and the message pattern is one of bad and unknown, and the classification of the CTA data is bad.

20. The non-transitory computer-readable medium as claimed in claim 19, wherein the program instructions configured to classify further facilitate:
  comparing the SMS message with the pre-determined message pattern data, wherein the pre-determined message pattern data comprises a set of pre-determined whitelisted message patterns and a set of pre-determined blacklisted message patterns; and
  classifying the message pattern as one of:
    good, when the SMS message matches with a pre-determined whitelisted message pattern;
    bad, when the SMS message matches with a pre-determined blacklisted message pattern; and
    unknown, when the SMS message does not match with any of the pre-determined message pattern data.

21. The non-transitory computer-readable medium as claimed in claim 19, wherein the program instructions configured to determine the sender reputation score further facilitate, evaluating the sender reputation score of the sender:
  based on one or more parameters including a sender header of the sender, an entity name of an entity associated with the sender, a telecom operator associated with the sender, a registration date of the sender header, average volume of SMS messages sent from the sender header in a month, a number of complaints associated with the sender header, an industry category of the entity, a type of the SMS message, a template identifier of a predetermined message pattern that matches with the SMS message, a number of variables in the matched predetermined message pattern, and a percentage of a static message content in the SMS message, in an Application to Person (A2P) transmission of the SMS message; and
  based on one or more parameters including a longevity of a sender phone number of the sender, a number of SMS messages sent from the sender phone number, a number of SMS messages received on the sender phone number, a number of A2P SMS messages received on the sender phone number, a length of the SMS message, a type of the SMS message, and a telecom operator associated with the sender phone number in a Person to Person (P2P) transmission of the SMS message.

22. The non-transitory computer-readable medium as claimed in claim 19, wherein the program instructions configured to classify further facilitate:
  comparing the sender reputation score with the pre-determined sender reputation data, wherein the pre-determined sender reputation data comprises a first score range, a second score range and a third score range; and
  classifying the sender as one of:
    good, when the sender reputation score falls within the first score range;
    bad, when the sender reputation score falls within the second score range; and
    unknown, when the sender reputation score falls within the third score range.

23. The non-transitory computer-readable medium as claimed in claim 19, wherein the program instructions configured to classify further facilitate:
  comparing each of one or more CTAs of the CTA data with the pre-determined CTA data, wherein the pre-determined CTA data comprises a set of pre-determined whitelisted CTAs and a set of pre-determined blacklisted CTAs; and
  classifying each of the one or more CTAs as one of good if the CTA matches with a pre-determined whitelisted CTA, bad if the CTA matches with a pre-determined blacklisted CTA, and unknown if the CTA does not match with any of the pre-determined CTAs.

24. The non-transitory computer-readable medium as claimed in claim 23, the program instructions configured to classify each of the one or more CTAs further facilitate:
  determining that the one or more CTAs comprise a Uniform Resource Locator (URL); and
  classifying the one or more CTAs as one of good and bad, based on a set of predefined conditions, wherein the set of predefined conditions comprise:
    identifying whether a name of at least one brand entity is present on a website associated with the URL;

detecting whether at least one logo associated with the at least one brand on the website; and determining whether a URL domain of the URL is different from a URL domain associated the at least one brand entity.

25. The non-transitory computer-readable medium as claimed in claim 19, further facilitate:

detecting that the SMS message is a genuine message when:
the SMS message is not a phishing message, and
the classification of at least two of the message pattern, the sender and the CTA data is one of good and unknown;

wherein in response to detecting that the SMS message is the genuine message, the program instructions further facilitate:

transmitting via the cellular communication network, the alert notification to the telecommunication server upon detecting that the SMS message is the genuine message; and automatically allowing the genuine message to be delivered to the recipient.

26. The non-transitory computer-readable medium as claimed in claim 19, further facilitate investigating the SMS message upon determining one of:

the classification of at least two of the message pattern, the sender and the CTA data is unknown; and the classification of the message pattern and the CTA data is one of good and unknown and the classification of the sender is good; and wherein the program instructions configured to investigate further facilitate:

calculating a total number of times the SMS message is received at a cellular gateway;

dynamically updating the classification of one or more of the message pattern, the sender and the CTA data based on one or more predefined conditions related to the total number of times; and dynamically updating a classification of the SMS message as one of phishing and genuine based on the dynamically updated classification.

27. The non-transitory computer-readable medium as claimed in claim 26, wherein the one or more predefined conditions for dynamically updating the classification of the sender comprise:

determining that the total number of times is same as a first predefined number of times over a first predefined period of time; and dynamically updating the classification of the sender based on the classification of the message pattern and the CTA data;

wherein the one or more predefined conditions for dynamically updating the classification of the message pattern comprise:

determining that the total number of times is same as a second predefined number of times over a second predefined period of time; and dynamically updating the classification of the message pattern based on the classification of the sender and the CTA data;

wherein the one or more predefined conditions for dynamically updating the classification of the CTA data comprise:

determining that the total number of times is same as a third predefined number of times over a third predefined period of time; and dynamically updating the classification of the CTA data of the SMS message based on the classification of the sender and the message pattern.

* * * * *